July 5, 1932.  G. P. BERRY  1,865,817
VACUUM BRAKE
Filed Aug. 25, 1930
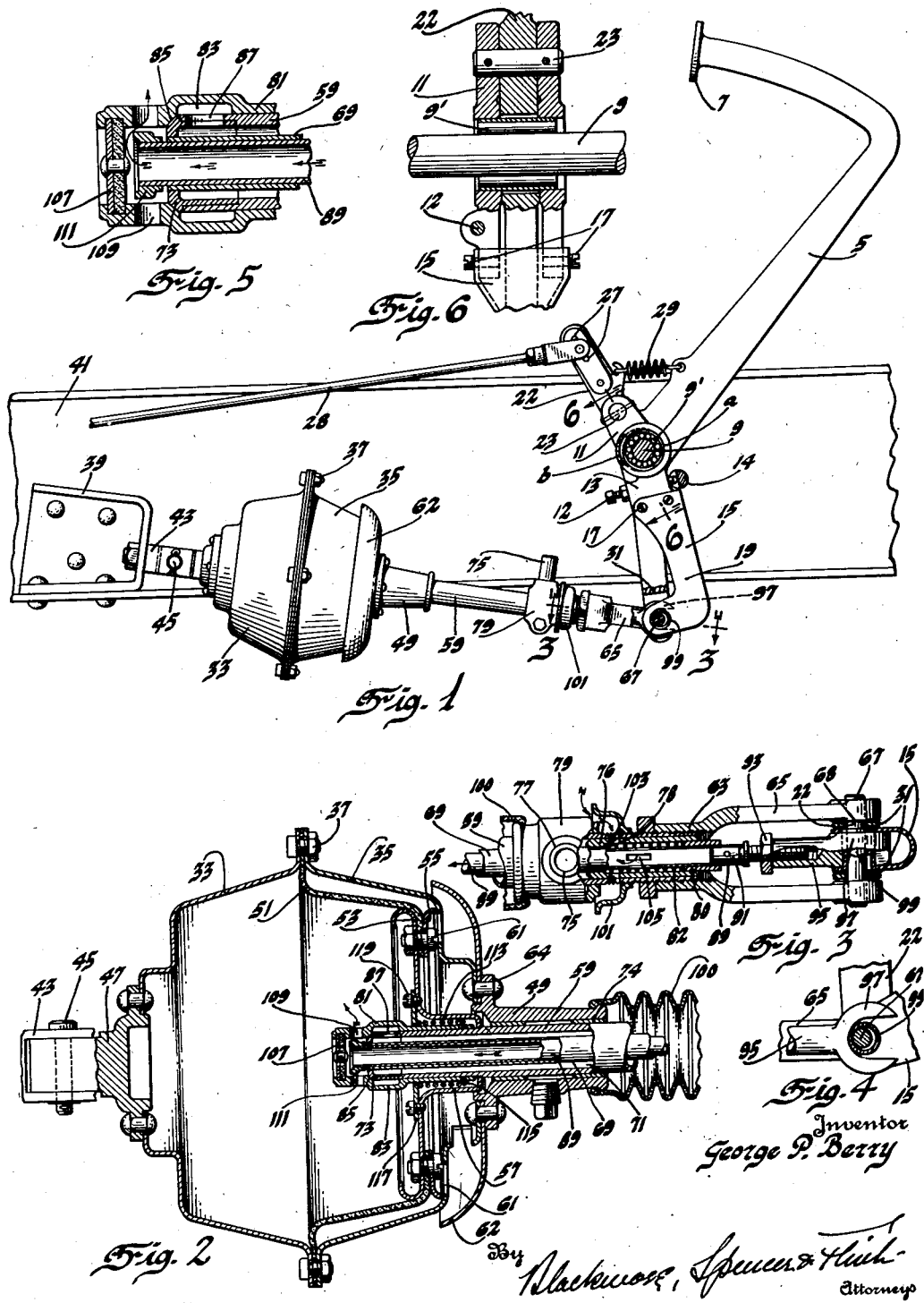
Inventor
George P. Berry Patented July 5, 1932

1,865,817

UNITED STATES PATENT OFFICE

GEORGE P. BERRY, OF DETROIT, MICHIGAN, ASSIGNOR TO GENERAL MOTORS RESEARCH CORPORATION, OF DETROIT, MICHIGAN, A CORPORATION OF DELAWARE

VACUUM BRAKE

Application filed August 25, 1930. Serial No. 477,607.

This invention relates to fluid pressure operated brakes wherein fluid pressure means is used as a servo brake operating device under the control of the operator to apply the brakes. The invention is of a type wherein the following major objects are to be attained:

The structure by the aid of which the auxiliary power means is rendered active is extremely simple; no braking by direct mechanical manually applied force occurs until after the maximum action of the servo mechanism; the operator always feels the reaction of the power brake reacting on the pedal; the arrangement is such that the fluid pressure mechanism is never to move the pedal in the direction of brake application; in the event of failure of the fluid pressure mechanism the arrangement is such as to immediately permit mechanical application by pedal pressure; also when the power mechanism is operation at its maximum further manually applied force may be added.

With the construction built to secure these major objects, this invention also provides an improvement in the air and suction valve arrangements over prior devices, and a novel operating connection whereby the valves are operated. Other objects and advantages will be understood from the following description and the accompanying drawing.

In the drawing—

Fig. 1 is a view in side elevation, partly in section.

Fig. 2 is a longitudinal section through the power cylinder.

Fig. 3 is a view in section on line 3—3 of Fig. 1.

Fig. 4 is a view in elevation of a detail of the operating connection.

Fig. 5 is a view in longitudinal section of the valve mechanism on an enlarged scale.

Fig. 6 is a section substantially on line 6—6 of Fig. 1.

In general the invention comprises a power cylinder, a valve, a brake lever, and a pedal. The power cylinder includes a reciprocating member or piston which is to be connected to the brake lever and by its movement to actuate the brakes through the rotation of the brake lever. The valve mechanism controls the admission of sub-atmospheric pressure to the power cylinder, this sub-atmospheric pressure being conveniently obtained from the engine manifold as is usual. The pedal is designed primarily to control the valve and incidentally to afford the means whereby the operator may supplement the action of the power brake when the latter is operating at its maximum intensity. The drawing shows the several parts enumerated, but omits the connecting conduit from the valve to the source of suction.

Referring by reference characters to the drawing, numeral 5 is the pedal. It will be understood, of course, that in place of a pedal any manually operated lever may be used. The pedal is provided with a foot engagement part 7 and is rotatably supported upon a shaft 9 having a bearing 9'. The pedal has a second arm comprising forks 11. This arm is positioned somewhat above the pivot shaft 9. Another forked arm 13 is positioned below the pivot shaft 9 and carries an extension in the form of a U-shaped stamping 15 secured to the fork ends 13 by fastening means 17. This stamping extends considerably below the ends 13 of the pedal, and at its extreme lower end is reduced in transverse dimension as at 19. Lever arm 13 is also provided with a screw or other adjusting means 12 to engage a fixed part 14, these parts 12 and 14 serving to limit the clockwise rotation, or release movement of the pedal.

What may be termed a brake lever is represented on the drawing by numeral 22. It has a central opening which is somewhat larger in diameter than the diameter of bearing 9. A pivot pin 23 is secured to the pedal arm 11 and rotatably supports the brake lever. Rotation of the brake lever about pivot 23 is limited by the engagement with the shaft bearing 9' at either one of two points of contact a or b as the lever swings about its pivot pin. Upwardly of pivot 23 the brake lever has a plurality of openings 27 for connection at either of these points with the brake rod 28. This rod 28 is merely illustrative of any convenient means by which the rotation of brake lever 22 may apply the vehicle brakes, which may be of any preferred kind. A spring 29 connects the brake lever 22 to the pedal 5, and is located preferably as shown in the drawing. The lower end of the brake lever is forked as at 31, its forked end straddling the lower end of the stamping 15.

The power unit or power cylinder may be conveniently constructed from two conical parts 33 and 35. These two parts have their larger diameter portions secured together by suitable fastening means 37. Part 33 may be anchored by a bracket 39 secured to any convenient part of the vehicle as, for example, the channel frame 41. The anchor consists of the member 43 secured in any preferred manner to part 39 and itself pivoted as at 45 to a lug 47 carried by part 33. Part 35 at its smaller end carries a piston guiding sleeve 49. A folding conical diaphragm 51 is clamped at its outer peripheral portions between parts 33 and 35 as shown in the drawing. Its inner and smaller periphery is clamped between a rigid reciprocating piston or plunger 53 and the cooperating ring 55. Plunger 53 has a sleeve portion 57 which is rigidly secured to a hollow piston rod 59. Suitable openings 61 admit air at all times to the space within the power cylinder at one side, the right side, of the diaphragm as shown in Fig. 2.

A shield 62 is preferably secured to the sleeve 49 and the part 35 by fastening means 64. The sliding movement of the piston rod 59 within the sleeve 49 is facilitated by a bushing or bushings 74. Piston rod 59 at its outer end has secured thereto a threaded sleeve 63 forked as at 65, its forked ends being secured by fastening means 67 to openings 68 in the ends of the brake lever 22. Within the tubular piston rod 59 is a concentric tube 69 forming an annular space 71. Between these two tubular members adjacent the outer ends of tubes 59 and 69 the annular space is closed in any way found convenient as by a closure member 76. It is also closed at the inner ends of these parts as shown in Figs. 2 and 5 where the outer part 59 is provided with a head closing the annular space and tapered to form a valve member 73.

An inlet pipe 75, extending from the manifold of the engine or other source of suction not illustrated, communicates by means of an opening 77 in a ring 79 secured to the piston rod and suitable openings in the piston rod with the annular space as will be clear from an inspection of the drawing. The suction from the manifold is transmitted from the manifold through pipe 75 into the annular space 71 and to the left side of the diaphragm 51 when permitted to do so by the action of the valve as described below. The valve in the present instance is preferably formed as a part of the power unit, and incorporated therein. In includes a sleeve or valve member 81 which as shown is slidable on the inner end of the piston rod 59. This sleeve member 81 is formed with an internal groove 83 near its inner end, the inner end of the valve being also provided with a valve seat 85 which cooperates with the valve member 73 to cut off the supply of suction from the manifold to the power cylinder.

Suitable openings 87 in the piston rod 59 afford communication between the annular space 71 and the groove 83. Since the pressure conditions in the groove are operating equally on both ends of the groove, these pressure conditions have no tendency to move the valve 81 in either direction, and the valve may be said to be pressure balanced and it is only moved by the application of extraneous forces. When the valve 81 is moved to the left from the position shown in Fig. 2 or Fig. 5, the seat 85 is raised from the valve member 73. The valve is therefore unseated, and it will be obvious that the suction of the manifold is in communication with that part of the power cylinder to the left of the diaphragm. This movement of unseating the valve is effected by a tubular rod 89 which is mounted to reciprocate within the inner tube 69. This movement is produced by engagement of the outer end of tubular rod 89 with the lower end of the pedal arm 15. The end of rod 89 has secured therein and extending therefrom a plug 91 which is externally threaded and to which is threaded and held by a lock nut 93 an extension 95 having a forked end 97 as shown in Fig. 4. The end of lever arm 15 which is of U-shape as shown in Fig. 3 carries a sleeve 99, this sleeve lying between the lower ends of lever arms 31. The fastening means 67 between the forks 65 and the lever arms 31 passes through this sleeve with a clearance as illustrated in Fig. 3. The closure member 76 has a shoulder 78, and in abutment with this shoulder and with a ring 80 carried by the outer end of the tubular rod 89 is a coil spring 82, acting to push said tubular rod 89 to a position in which the forked end 97 engages the collar 99.

Within a guard member 101 the piston rod and the closure 76 have registering openings 103 communicating with the space occupied by the spring 82. Openings 105 lead from this space to the interior of the tubular rod 89. It is through this passageway as just described that the tubular member 89 is always open to the outer air.

The inner end of sleeve 81 is closed by a disc 107 and peripherally adjacent the disc the sleeve has one or more openings 109 leading to the interior of the power cylinder to the left of the diaphragm. The inner end of the tubular rod 89 is provided with a valve member 111 which is arranged to seat on the disc 107, the disc therefore constituting a valve seat. The sleeve 81 is spring actuated by a spring 113 engaging an abutment ring 115 carried by the sleeve, and also engaging a plate 117 secured by fastening means 119 to the piston member 53. If desired a flexible boot 100 may be used to protect the sliding engagement of the piston rod and sleeve 49. Such a boot is shown in Fig. 2.

The operation of the device is substantially as follows:

The pedal is held against stop 14 by the combined action of springs 82 and 29, and the brake lever is in contact with the shaft bearing 9' at point a. With the pedal and the lever in these positions the spring 113 insures the closure of the suction valve while the pressure of spring 82 acting upon rod 89 opens the air valve. If now it is desired to apply the brake the pedal is depressed turning clockwise. If spring 29 is employed and if it offers at the start greater resistance than does the take-up of clearance at the brakes, the pedal and the lever 22 move as a unit during this initial movement. The resistance at the brake then becomes greater than that of spring 29 with the result that the pedal turns relatively to the brake lever. In so doing the point 27 acts as a fulcrum for lever 22. Lever 22 is rotated in a counter-clockwise direction about its fulcrum 27 by the clockwise rotation of the pedal acting upon the brake lever 22 by the connecting pin 23. This movement results in the breaking of the contact at a, and the contact at b is approached. When the contact at a is broken the rod 89 pushes the valve member 111 against the seat 107, and closes the air valve.

The next increment of motion causes the sleeve 81 to be pushed inwardly through the engagement of parts 111 and 107, this inward movement of sleeve 81 opening the suction valve through the separation of the seat 85 from the valve member 73. These valve actions occur while the points a and b are both out of contact with the brake lever. The piston or plunger 53 is then in an unbalanced position between sub-atmospheric pressure on its left side and atmospheric pressure on its right side. This causes a pull through piston rod 59 on the lower end of the brake lever 22 and the power brake is actuated. The operation may perhaps be best understood by assuming that point 27 is a fulcrum of lever 22. The developing suction in the power cylinder is operating to rotate the pedal in a counter-clockwise direction through the connection at 23. When this developing force is sufficient to balance the pedal pressure the inward movement of 59 has caused the engagement of the valve members 73 and 85 and the suction valve is closed.

The manually applied pressure at the pedal with its long leverage balances the forces acting at point 27 and at the lower end of the brake lever, and the operator easily resists the tension on the brake rod and "feels" the intensity of the power brake. This action of automatically cutting off the source of suction is not attended by the opening of the air valve unless the operator diminishes the pedal pressure. Therefore the brakes remain applied with a predetermined degree of intensity which is measured by the resistance felt by the operator on the foot pad 7. The brakes may then be released by the removal of the pressure at 7 whereupon the spring 82 opens the air valve. On the other hand if additional pressure is desired it may be secured by a further depression of the pedal, whereupon the action occurs as before. It will be understood that a diminution of pressure on the pedal will be attended by a proportionate reduction of the intensity of the force applied by the vacuum servo device. It should be observed that in so applying the brake the operator has nothing to control but the valve and no part of his manually applied force is directly operating on the brake. The tensions in the brake rod 28 and in piston rod 59 constitute forces acting upon pivot 23 tending to rotate the pedal counter-clockwise which forces are resisted by the manual effort on the pedal. The effort required is but little, owing to the long leverage on the pedal as compared with the short arm between pivot 23 and the pedal pivot 9. The "feel" is therefore present and is proportional to the itensity of the power brake. Again and particularly important, the power brake mechanism, insofar as it effects the pedal, never tends to move it in the direction of brake application. The only influence is one tending to move it against the force exerted by the operator. There is never a tendency of the pedal to move from the foot of the operator, which movement is characteristic of some power brakes. Only when the brake lever reaches its second contact at b can manual effort be applied to actuate the brake directly. When so in contact at b the brake lever and pedal act as a unit. This may occur if the suction brake for any reason is inoperative. It may also occur at any time while the suction brake is operating at its maximum by depressing the pedal sufficiently not only to keep up with the rotation of the brake lever, but to keep the brake lever in contact at b, whereupon any desired manual effort may be added to the servo brake.

Incidental to the construction it should be noted that the pressure within groove 83 of the valve member 81 is effective in both directions, so that the valve itself is in balanced condition and has no tendency to move one way or the other except by the application of extraneous forces. The spring 113 insures the closing of the suction valve when the parts are in the position to permit it to so function. The construction is extremely simple, occupying but little more room than the ordinary pedal. Compactness is also attained by the incorporation of the valve mechanism within the power unit, and by the concentric relation of the operating rod 89 within the piston 59. By the arrangement of the tubular conical power cylinder with the foldable diaphragm, a comparatively long stroke is given the piston and such as could not occur were the diaphragm substantially flat. It may be explained that the spring 29 operates to permit the clearance at the brake to be taken up before the relative movement between the pedal and the brake lever introduces the suction brake operating mechanism. This spring may be omitted if desired. In the absence of spring 29 spring 82 will serve to restore the pedal to its position of release and against the stop 14.

As compared with previous constructions the arrangement for contact between the lower end of the pedal arm 15 and the actuating rod 89 involves simplification and improvement. Improvement has also been made in the provision of the valve seat 107 carried positively by the inner end of the sliding sleeve 81.

I claim:

1. In a servo brake, a power cylinder, a piston therein, a piston rod, said cylinder having an opening to the atmosphere on a first side of the piston, a sleeve slidable on the inner end of the piston rod, said sleeve carrying valve seats and one or more openings to the second side of the piston, means affording a passage circular in cross section within the piston rod, mechanism affording an annular passage surrounding the first passage also within said piston rod, said last named mechanism provided with an opening for affording communication with the second side of the piston and also including a valve member to engage one of said seats, and said means having a valve member to engage the other seat, said passages having other openings to communicate with fluids under unequal pressures.

2. The invention defined by claim 1 together with yielding means operable upon the said sleeve to hold in closed position the valve associated with said mechanism.

3. In a servo brake, a power cylinder, a piston, a hollow piston rod, said piston rod extending through the piston, a first hollow tube within and concentric with said piston rod, said piston rod and first hollow tube forming an annular passage with an opening therefrom at its inner end to the space within the power cylinder, said rod and first tube terminally united to form a valve member, a second hollow tube within the first hollow tube, said second hollow tube having an open inner end and an annular valve member at said end, a sleeve slidable upon the inner end of said piston rod, said sleeve having a recess adjacent the said opening from the annular space, said sleeve also having an opening to the power cylinder, said sleeve also having a valve seat to cooperate with the valve at the end of the rod and first tube, and a terminal disc to engage as a valve seat with the valve member at the end of the second tube.

4. In a power brake having as parts thereof a power cylinder with a piston rod and a concentric valve rod within said rod, a manually operable lever, a sleeve carried by said manually operable lever, a relatively movable brake lever having forked arms straddling the end of the manually operable lever, a yoke connected to said piston rod and having furcations straddling the ends of the brake lever, a bolt connecting said furcations and brake lever arms and extending with a clearance through said sleeve, said valve rod having a forked end engaging said sleeve.

5. The invention defined by claim 4 together with yielding means operable to hold said forked end of said valve rod in contact with said sleeve.

In testimony whereof I affix my signature.
GEORGE P. BERRY.